Patented Oct. 21, 1930

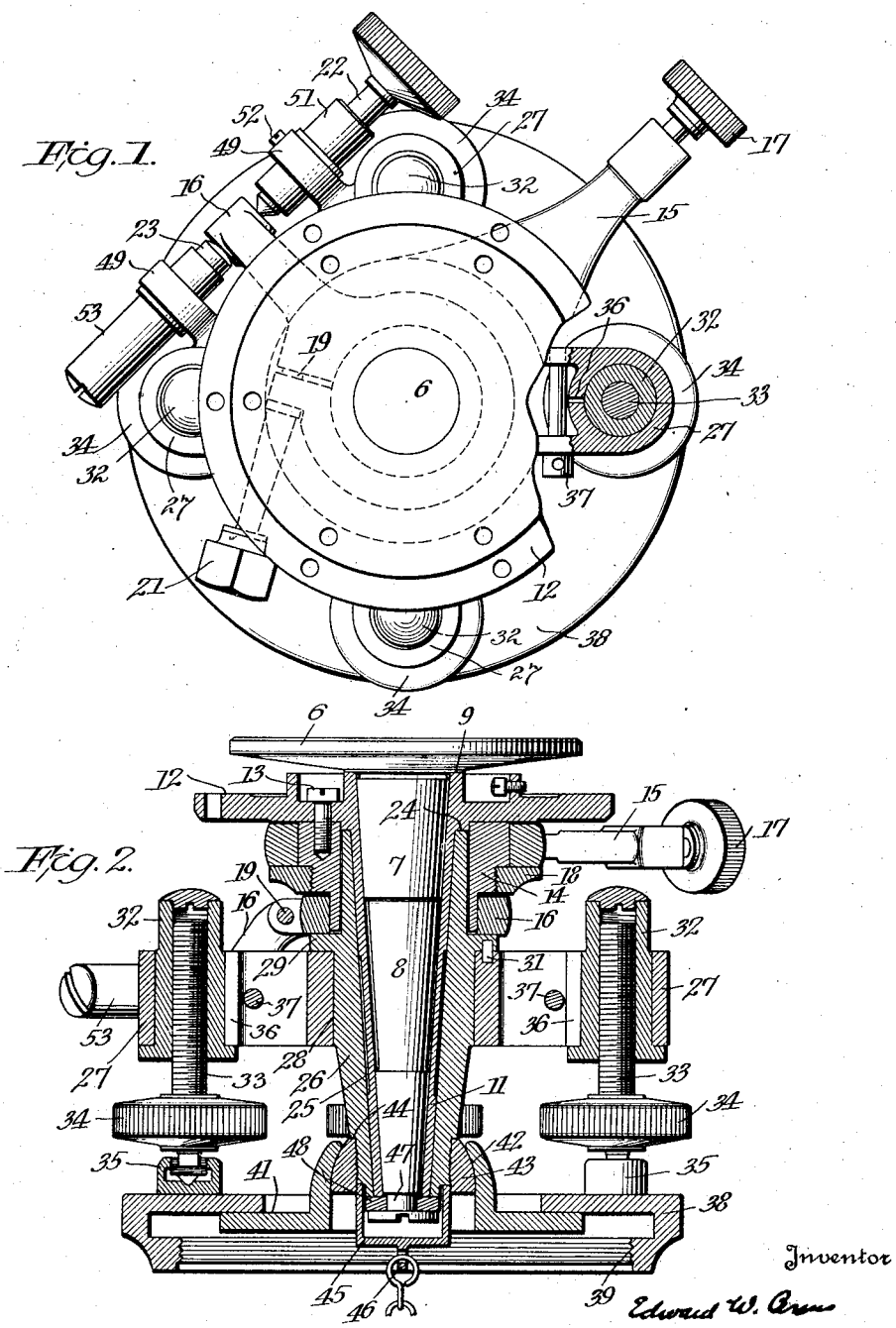

1,779,080

UNITED STATES PATENT OFFICE

EDWARD W. ARMS, OF TROY, NEW YORK, ASSIGNOR TO W. & L. E. GURLEY, OF TROY, NEW YORK, A CORPORATION OF NEW YORK

LEVELING HEAD

Application filed December 22, 1927. Serial No. 241,998.

This invention relates to leveling heads for surveying instruments and resides in certain details of construction conducive to ease of manufacture and repair and producing a better instrument.

The object of the invention is to take full advantage of certain highly developed manufacturing processes of recent origin, and to avail of certain new materials which could not otherwise be successfully used in this art.

The invention will now be described with reference to the accompanying drawing which illustrates by way of example a leveling head for a transit.

In the drawing,—

Fig. 1 is a plan view.

Fig. 2 is a vertical axial section.

The head on which the transit frame (not shown) is mounted, appears at 6 and is formed integrally with tapered spindle 7, which is relieved at 8 and which has a thrust shoulder 9.

The spindle 7 turns in a tapered sleeve or quill 11 ground accurately to fit, and supporting at its upper end shoulder 9 in such relation as to prevent seizing or looseness of the taper bearing. The quill 11 has at its upper end an outwardly projecting flange 12 to which is connected the graduated limb (not shown).

Connected to flange 12 by screws, one of which appears at 13, is an annular collar 14 which receives the limb clamp 15 and the leveling head clamp 16 of usual construction.

The limb clamp 15 is tightened by a screw whose head appears at 17, and when free rotates on collar 14 on which it is retained by nut 18. The clamp member 15 enters between the usual opposed adjusting screw and spring plunger carried by the transit frame (not shown).

The leveling head clamp 16 is tightened by a clamp screw 19 whose head appears at 21 and when unclamped permits the rotation of the limb and quill 11 relatively thereto. The leveling head clamp 16 enters between the usual adjusting screw 22 and spring plunger 23 carried on the spider of the leveling head which is yet to be described.

The parts so far described conform to known practice.

The quill 11 has a shoulder 24 and is relieved at 25. The quill is rotatable in a tapered bearing shell 26 the shoulder 24 resting on the upper end of shell 26 and performing a function similar to that of shoulder 9 by preventing seizing or shaking of the quill in the sleeve 26.

Contrary to prior practice, shell 26 is not integral with spider 27 of the leveling head but is removably supported therein in such a way that the two are rigidly connected when in use. This is accomplished by a close cylindrical slip fit 28 and annular flange 29, the flange seating on the spider and being held against rotation by a pin 31. The flange 29 also serves to retain clamp 16 on collar 14.

The spider 27 is preferably cruciform, as is usual, the arms being of skeleton formation to reduce weight as indicated in Fig. 1. Each arm is formed at its end with an opening to receive and closely confine a flanged internally threaded thimble 32 which carries a leveling screw 33 with knurled wheel 34 and swiveled thrust head 35. Each arm is slotted as shown at 36 and capstan screws 37 serve to clamp the arms upon the inserted thimbles 32.

The whole leveling head structure is supported by screws 33 on annular base plate 38 which is threaded at 39 to screw onto a tripod head or other support (not shown).

The parts are held in engagement with base plate 38 and allowed universal lateral and angular motion of reasonable range by plate 41 which engages beneath plate 38 and has an annular socket 42 of spherical contour projecting upward through the central opening of plate 38.

In this socket engages a nut 43 of spherical contour which is threaded onto the lower end of shell 26 and seats against shoulder 44. In this way, what may be described generically as a universal joint, is formed. The nut is locked in position by a cup-shaped check nut 45 screwed into the projecting lower end of nut 43 and seating against a shoulder formed on shell 26 near the lower end thereof. Nut 45 has an eye 46 for the connection of the plumb line.

The spindle 7, quill 11 and shell 26 are held in assembled relation by machine screw 47 threaded into the end of spindle 7, and washer 48 through which the screw passes, the washer seating against the end of shell 26 within nut 45.

The screw 22 and spring plunger 23 are supported on brackets 49 integral with spider 27. The screw 22 is threaded in a barrel or nut 51, which is threaded into one bracket 49 and locked by clamp screw 52 against turning. The plunger 23 is guided in sleeve 53 which houses the spring (not shown). Sleeve 53 is threaded into the other bracket 49.

The described construction of the parts is such that the thrust of the leveling screws holds all parts in assembled relation. At the same time internal strains set up in the spider by the thrust of leveling screws are not transmitted to the bearing shell 26, or at any rate are not transmitted in any appreciable degree. The shell 26 being a solid of revolution with reference to its longitudinal axis is symmetrical and symmetrically stressed and stressed longitudinally only. Hence distortion and strains are minimized and rendered neutral so far as accuracy of the spindle bearing is concerned.

The widest range of choice of materials is offered, and it becomes possible to use a die casting for the spider 27 with a marked economy in manufacture resulting from the elimination of numerous machining operations.

The ease and economy of making repairs and replacements is, from the user's standpoint, probably the most valuable feature of the invention. The spindle bearing is the most important and one of the most expensive parts of the instrument. In prior constructions injury to the spider, and in some cases very minor injuries, required the replacement of the whole part including the bearing. Modern manufacturing methods make possible the production of bearing shells 26 on the basis of strict interchangeability. Thus the spider or the shell may be replaced individually in a leveling head embodying the present invention, and this replacement can be made in the field, a practice heretofore considered beyond the range of practicability.

What is claimed is,—

1. A leveling head comprising in combination, a base plate; a spider having a central opening; a plurality of leveling screws reacting adjustably between said base plate and spider; a main spindle bearing member adapted to guide in rotary movements the spindle structure of a geometrical instrument, said bearing member being seated in said opening in the spider and having means to support said spider against stress exerted by said leveling screws; and a universal joint connecting said bearing member and base plate.

2. A leveling head comprising in combination, a base plate; a bearing shell adapted to guide in rotary movements the spindle structure of a geometrical instrument, said shell being symmetrical with reference to the axis of its bearing surface and having a thrust shoulder; a universal joint connecting said shell and base plate; a plurality of adjustable leveling screws; and a member in thrust engagement with said shoulder and adjusted by said screws.

3. A leveling head comprising in combination, a base plate; a bearing shell which is annular solid of revolution about the bearing axis, said shell being adapted to guide in rotary movements the spindle structure of a geometrical instrument, and having an annular thrust shoulder; a universal joint connecting said shell and base plate; a plurality of adjustable leveling screws; and a spider separate from said bearing shell adjusted by said screws and in thrust engagement with the shoulder on said bearing shell to stress the latter in tension in the direction of its axis.

4. A leveling head structure comprising in combination, a base plate; a spider formed with openings to receive and confine thimbles for leveling screws and a central opening to receive a main spindle bearing; leveling screw units each including a thimble seated in a corresponding one of said openings, said units reacting adjustably between said base and spider; a main spindle bearing member adapted to guide in rotary movements the spindle structure of a geometrical instrument, said member being seated in said central opening and provided with means to support said spider against the stress exerted by said leveling screw units; and a universal joint connecting said bearing and base plate adapted to permit universal angular motion of said bearing and spider relatively to said base plate.

5. In a leveling head, the combination of an annular base plate; a thrust plate laterally shiftable relatively to said base plate an and having a spherical bearing; a spider; a plurality of leveling screws threaded in said spider and engaging the upper side of said base plate; and a spindle bearing member adapted to guide in rotary movements the spindle structure of a geometrical instrument, said member being distinct from said spider and engaging the spider and said spherical bearing, whereby the spindle bearing member is stressed in simple tension in the direction of its axis.

6. A leveling head of that known type which includes a base; a spider supported on the base by means of leveling screws; and a spindle bearing member, which is adapted to guide in rotary movements the spindle structure of a geometrical instrument, and which forms a connection between the base and the spider; characterized by the fact that said bearing member is a separate piece from the spider and so related to the spider and base that the bearing member is stressed in simple axial tension in all positions of the device.

7. A leveling head comprising in combination, a base plate; a spider having a central opening; a plurality of leveling screws reacting adjustably between said base plate and spider; a main spindle bearing member adapted to guide in rotary movements the spindle structure of a geometrical instrument, said bearing member being seated in said opening in the spider, rigidly confined thereby, and having means to support said spider against stress exerted by said leveling screws; and a universal joint connecting said bearing member and base plate.

8. A leveling head comprising in combination, a base plate; a bearing shell adapted to guide in rotary movements the spindle structure of a geometrical instrument, said shell being symmetrical with reference to the axis of its bearing surface and having a thrust shoulder; a universal joint connecting said shell and base plate; a plurality of adjustable leveling screws; and a member encircling and rigidly confining said bearing shell and in thrust engagement with said shoulder, said member being adjustable by said screws.

9. A leveling head comprising in combination, a base plate; a bearing shell which is an annular solid of revolution about the bearing axis, said shell being adapted to guide in rotary movements a spindle structure of a geometrical instrument and having an annular thrust shoulder; a universal joint connecting said shell and base plate; a plurality of adjustable leveling screws; and a spider separate from said bearing shell and adjusted by said screws, said spider encircling and rigidly confining said bearing shell and entering into thrust engagement with the shoulder on said bearing shell to stress the latter in tension in the direction of its axis.

In testimony whereof I have signed my name to this specification.

EDWARD W. ARMS.